(12) United States Patent
Li et al.

(10) Patent No.: US 8,731,580 B2
(45) Date of Patent: May 20, 2014

(54) SYSTEM AND METHOD FOR TERMINAL LOCATION

(75) Inventors: Pengfei Li, Shenzhen (CN); Shuai Su, Shenzhen (CN); Yujie Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 213 days.

(21) Appl. No.: 13/505,589

(22) PCT Filed: Jun. 21, 2010

(86) PCT No.: PCT/CN2010/074140
§ 371 (c)(1),
(2), (4) Date: May 2, 2012

(87) PCT Pub. No.: WO2011/091641
PCT Pub. Date: Aug. 4, 2011

(65) Prior Publication Data
US 2012/0220313 A1    Aug. 30, 2012

(30) Foreign Application Priority Data
Jan. 29, 2010  (CN) .......................... 2010 1 0107710

(51) Int. Cl.
*H04W 24/00*   (2009.01)
(52) U.S. Cl.
USPC .................. 455/456.1; 455/456.2; 455/456.3; 455/456.4; 455/456.5; 455/456.6
(58) Field of Classification Search
None
See application file for complete search history.

(56) References Cited

U.S. PATENT DOCUMENTS

| 2007/0091834 A1 | 4/2007 | Lee |
| 2008/0045235 A1 | 2/2008 | Kennedy et al. |
| 2009/0325566 A1* | 12/2009 | Bell et al. ...................... 455/419 |
| 2010/0323723 A1* | 12/2010 | Gerstenberger et al. ... 455/456.5 |
| 2012/0015669 A1* | 1/2012 | Qin et al. ................... 455/456.1 |

FOREIGN PATENT DOCUMENTS

| CN | 1832627 A | 9/2006 |
| CN | 101489180 A | 7/2009 |
| WO | 2007028827 A1 | 3/2007 |

OTHER PUBLICATIONS

International Search Report for PCT/CN2010/074140 dated Sep. 29, 2010.

* cited by examiner

*Primary Examiner* — Suhail Khan
(74) *Attorney, Agent, or Firm* — Ling Wu; Stephen Yang; Ling and Yang Intellectual Property (57) ABSTRACT

A terminal positioning system and terminal positioning method are provided. The system includes: a first distance acquiring module acquiring a first distance between a first base station and a terminal located in an overlapped coverage area of the first base station and a second base station according to first time offset information of the terminal; a second distance acquiring module acquiring a second distance between the second base station and the terminal according to second time offset information; an angle acquiring module acquiring a first signal arrival angle of the terminal relative to the first base station and a second signal arrival angle of the terminal relative to the second base station; a first positioning module obtaining an initial location of the terminal according to the first and second signal arrival angles, and a second positioning module determining the accurate location of the terminal.

15 Claims, 5 Drawing Sheets

SYSTEM AND METHOD FOR TERMINAL LOCATION

TECHNICAL FIELD

The present invention relates to the technical field of mobile communication, and in particular, to a terminal positioning system and a terminal positioning method.

BACKGROUND ART

With the development of mobile communication technology and the increase of service requirements, the positioning service based on the location of the terminal has drawn more and more favor from the operators, and what is more, the LBSs (Location Based Services) also concern many fields such as traffic, logistics, public security, emergency and daily life, etc., and can provide various services such as navigation, logistics management, traffic information, daily arrangement and so on with a rather wide range of application.

The conventional method for positioning a terminal may be based on positioning parameters including the TOA (Time Of Arrival), the TDOA (Time Difference Of Arrival), OTD (Observed Time Difference), AOA (Angle Of Arrival) and so on of the terminal to achieve positioning of a terminal.

As for the above method for positioning a terminal, the obtaining of various parameters is the key of the positioning method, and during the process of positioning a terminal, an additional channel between the base station and the terminal is often needed to transmit data including related positioning parameters and positioning result for multiple times, thus a large number of network resources are occupied.

SUMMARY OF THE INVENTION

In view of the above, the present invention provides a system for positioning a terminal and a method for positioning a terminal, which can determine the location of a terminal by using the existing resources in the process of the base station ranging for the terminal, thus saving the network resources.

In order to solve the above problem, the present invention provides a terminal positioning system, comprising: a first base station, a second base station and a terminal to be positioned which is located in an overlapped coverage area of the first base station and the second base station, and the system further comprises:

a first distance acquiring module, which is configured to acquire a first distance between the first base station and the terminal according to first time offset information of the terminal, wherein, the first time offset information is time offset information, obtained in a process of the first base station ranging for the terminal, of the terminal relative to the first base station;

a second distance acquiring module, which is configured to acquire a second distance between the second base station and the terminal according to second time offset information of the terminal, wherein, the second time offset information is time offset information, obtained in a process of the second base station ranging for the terminal, of the terminal relative to the second base station;

an angle acquiring module, which is configured to acquire a first signal arrival angle of the terminal relative to the first base station and a second signal arrival angle of the terminal relative to the second base station according to the first distance, the second distance and a third distance between the first base station and the second base station;

a first positioning module, which is configured to obtain an initial location of the terminal according to the first signal arrival angle and the second signal arrival angle; and a second positioning module, which is configured to calibrate the initial location of the terminal to determine an accurate location of the terminal.

Preferably, the second positioning module comprises:

a beam directing module, which is configured to control an antenna array of the first base station to emit to the terminal a directed beam oriented to the first signal arrival angle, or control an antenna array of the second base station to emit to the terminal a directed beam oriented to the second signal arrival angle;

a comparing module, which is configured to compare signal quality parameters reported by the terminal before and after the directed beam is emitted, and obtain a comparison result; and a determining module, which is configured to calibrate the initial location of the terminal according to the comparison result to determine the accurate location of the terminal.

Preferably, the directed beam is:

$$z(t) = As(t) \sum_{m=0}^{M-1} w_m e^{-j\beta m \Delta x \cos\phi \sin\theta}$$

wherein, $z(t)$ is the directed beam, $As(t)$ is a signal measured at an original point reference array element, $M$ is a number of antennae in the antenna array, $w_m$ is a phase weighted factor of a $m^{th}$ array element in the antenna array, $\beta$ is an amplitude of a power of the antenna array, $m\Delta x$ is a distance between the $m^{th}$ array element and the original point reference array element, $\phi$ is the first signal arrival angle or the second signal arrival angle, and $\theta$ is an angle of elevation of the antenna array relative to the terminal.

Preferably, the first distance is calculated using the following formula:

$$D_1 = [(\tau_1/\text{Bandwidth})*\text{Velocity}]/2$$

the second distance is calculated using the following formula:

$$D_2 = [(\tau_2/\text{Bandwidth})*\text{Velocity}]/2$$

wherein, $D_1$ is the first distance, $D_2$ is the second distance, $\tau_1$ is the first time offset information, $\tau_2$ is the second time offset information, Bandwidth is a transmission bandwidth of the system, which is quantified to be a point number of Fast Fourier transform (FFT), and Velocity is a transmission velocity of the signal. Preferably, the first signal arrival angle is calculated using the following formula:

$$\cos\phi_1 = \frac{D_1^2 + D_0^2 - D_2^2}{2 \times D_1 \times D_0}$$

the second signal arrival angle is calculated using the following formula:

$$\cos\phi_2 = \frac{D_2^2 + D_0^2 - D_1^2}{2 \times D_2 \times D_0}$$

wherein, $\phi_1$ is the first signal arrival angle, $\phi_2$ is the second signal arrival angle, $D_1$ is the first distance, $D_2$ is the second distance, and $D_0$ is the third distance.

The present invention further provides a terminal positioning method applied in a terminal positioning system, and the terminal positioning system comprises: a first base station, a second base station and a terminal to be positioned which is located in an overlapped coverage area of the first base station and the second base station; the terminal positioning method comprises the following steps:

the terminal positioning system acquiring a first distance between the first base station and the terminal according to first time offset information of the terminal, wherein, the first time offset information is time offset information, obtained in a process of the first base station ranging for the terminal, of the terminal relative to the first base station;

the terminal positioning system acquiring a second distance between the second base station and the terminal according to second time offset information of the terminal, wherein, the second time offset information is time offset information, obtained in a process of the second base station ranging for the terminal, of the terminal relative to the second base station;

the terminal positioning system acquiring a first signal arrival angle of the terminal relative to the first base station and a second signal arrival angle of the terminal relative to the second base station according to the first distance, the second distance and a third distance between the first base station and the second base station;

the terminal positioning system obtaining an initial location of the terminal according to the first signal arrival angle and the second signal arrival angle; and the terminal positioning system calibrating the initial location of the terminal to determine an accurate location of the terminal.

Preferably, the step of the terminal positioning system calibrating the initial location of the terminal to determine an accurate location of the terminal comprises:

the terminal positioning system controlling an antenna array of the first base station to emit to the terminal a directed beam oriented to the first signal arrival angle, or controlling an antenna array of the second base station to emit to the terminal a directed beam oriented to the second signal arrival angle;

the terminal positioning system comparing signal quality parameters reported by the terminal before and after the directed beam is emitted, and obtaining a comparison result; and the terminal positioning system calibrating the initial location of the terminal according to the comparison result to determine the accurate location of the terminal.

Preferably, the directed beam is:

$$z(t) = As(t) \sum_{m=0}^{M-1} w_m e^{-j\beta m \Delta x \cos\phi \sin\theta}$$

wherein, $z(t)$ is the directed beam, $As(t)$ is a signal measured at an original point reference array element, M is a number of antennae in the antenna array, $w_m$ is a phase weighted factor of a $m^{th}$ array element in the antenna array, $\beta$ is an amplitude of a power of the antenna array, $m\Delta x$ is a distance between the $m^{th}$ array element and the original point reference array element, $\phi$ is the first signal arrival angle or the second signal arrival angle, and $\theta$ is an angle of elevation of the antenna array relative to the terminal. Preferably, the first distance is calculated using the following formula:

$$D_1 = [(\tau_1/\text{Bandwidth}) * \text{Velocity}]/2$$

the second distance is calculated using the following formula:

$$D_2 = [(\tau_2/\text{Bandwidth}) * \text{Velocity}]/2$$

wherein, $D_1$ is the first distance, $D_2$ is the second distance, $\tau_1$ is the first time offset information, $\tau_2$ is the second time offset information, Bandwidth is a transmission bandwidth of the system, which is quantified to be a point number of Fast Fourier transform (FFT), and Velocity is a transmission velocity of the signal.

Preferably, the first signal arrival angle is calculated using the following formula:

$$\cos\phi_1 = \frac{D_1^2 + D_0^2 - D_2^2}{2 \times D_1 \times D_0}$$

the second signal arrival angle is calculated using the following formula:

$$\cos\phi_2 = \frac{D_2^2 + D_0^2 - D_1^2}{2 \times D_2 \times D_0}$$

wherein, $\phi_1$ is the first signal arrival angle, $\phi_2$ is the second signal arrival angle, $D_1$ is the first distance, $D_2$ is the second distance, and $D_0$ is the third distance.

The present invention further provides a terminal positioning apparatus, applied to position a terminal located in an overlapped coverage area of a first base station and a second base station, wherein, the terminal positioning apparatus comprises:

a first distance acquiring module, which is configured to acquire a first distance between the first base station and the terminal according to first time offset information of the terminal, wherein, the first time offset information is time offset information, obtained in a process of the first base station ranging for the terminal, of the terminal relative to the first base station;

a second distance acquiring module, which is configured to acquire a second distance between the second base station and the terminal according to second time offset information of the terminal, wherein, the second time offset information is time offset information, obtained in a process of the second base station ranging for the terminal, of the terminal relative to the second base station;

an angle acquiring module, which is configured to acquire a first signal arrival angle of the terminal relative to the first base station and a second signal arrival angle of the terminal relative to the second base station according to the first distance, the second distance and a third distance between the first base station and the second base station;

a first positioning module, which is configured to obtain an initial location of the terminal according to the first signal arrival angle and the second signal arrival angle; and a second positioning module, which is configured to calibrate the initial location of the terminal to determine an accurate location of the terminal.

Preferably, the second positioning module comprises:

a beam directing module, which is configured to control an antenna array of the first base station to emit to the terminal a directed beam oriented to the first signal arrival angle, or control an antenna array of the second base station to emit to the terminal a directed beam oriented to the second signal arrival angle;

a comparing module, which is configured to compare signal quality parameters reported by the terminal before and after the directed beam is emitted, and obtain a comparison result; and a determining module, which is configured to calibrate the initial location of the terminal according to the comparison result to determine the accurate location of the terminal.

Preferably, the directed beam is:

$$z(t) = As(t) \sum_{m=0}^{M-1} w_m e^{-j\beta m \Delta x \cos\phi \sin\theta}$$

wherein, $z(t)$ is the directed beam, $As(t)$ is a signal measured at an original point reference array element, M is a number of antennae in the antenna array, $w_m$ is a phase weighted factor of a $m^{th}$ array element in the antenna array, $\beta$ is an amplitude of a power of the antenna array, $m\Delta x$ is a distance between the $m^{th}$ array element and the original point reference array element, $\phi$ is the first signal arrival angle or the second signal arrival angle, and $\theta$ is an angle of elevation of the antenna array relative to the terminal.

Preferably, the first distance is calculated using the following formula:

$$D_1 = [(\tau_1/\text{Bandwidth}) * \text{Velocity}]/2$$

the second distance is calculated using the following formula:

$$D_2 = [(\tau_2/\text{Bandwidth}) * \text{Velocity}]/2$$

wherein, $D_1$ is the first distance, $D_2$ is the second distance, $\tau_1$ is the first time offset information, $\tau_2$ is the second time offset information, Bandwidth is a transmission bandwidth of the system, which is quantified to be a point number of Fast Fourier transform (FFT), and Velocity is a transmission velocity of the signal.

Preferably, the first signal arrival angle is calculated using the following formula:

$$\cos\phi_1 = \frac{D_1^2 + D_0^2 - D_2^2}{2 \times D_1 \times D_0}$$

the second signal arrival angle is calculated using the following formula:

$$\cos\phi_2 = \frac{D_2^2 + D_0^2 - D_1^2}{2 \times D_2 \times D_0}$$

wherein, $\phi_1$ is the first signal arrival angle, $\phi_2$ is the second signal arrival angle, $D_1$ is the first distance, $D_2$ is the second distance, and $D_0$ is the third distance.

In the present invention, the time offset information of terminal obtained during the initial ranging process of the base station for the terminal is acquired, and the distance between the terminal and the base station is acquired according to the time offset information, the angle relationship between the base station and the terminal is acquired according to the distance between the terminal and the base station, and then the terminal is initially positioned, and then the terminal is accurately positioned according to the multi-antenna calibrating mechanism in the beam forming technology. Since the positioning parameters (time offset information) adopted in the present invention are existing resources in the initial ranging process of the base station for the terminal, no additional channel is required to transmit related positioning data, thus saving network resources.

PREFERRED EMBODIMENTS OF THE PRESENT INVENTION

When accessing a network, a terminal originates an initial ranging and sends a ranging code to a base station, which detects the ranging code sent by the terminal and obtains a detection result, which comprises time offset information of the terminal that can provide location information of the terminal. In an example of the invention, the time offset information is used to position the terminal. Since the adopted positioning parameters (time offset information) are existing resources during the process of the base station initially ranging for the terminal, no additional channel is required to transmit related positioning data, thus saving network resources.

Before describing the example of the present invention, the process of the base station initially ranging for the terminal will be described firstly. The process of the base station initially ranging for the terminal comprises the following steps.

Step one, when accessing a network, a terminal acquires DL-Map (Downlink Mapping) information and DCD (Downlink Channel Descriptor) message sent by the base station, and gets downlink synchronization with the base station.

Step two, the terminal obtains parameters of an available uplink channel through a UCD (Uplink Channel Descriptor) message periodically sent by the base station, and sends the initial ranging code to the base station when waiting until the UL-Map (Uplink Mapping) offers a transmission chance with regard to the uplink channel.

Step two, after receiving the initial ranging code, the base station detects the initial ranging code, and after successful detection, the base station broadcasts a RNG-RSP (Ranging Response) message to the terminal, where the RNG-RSP message comprises frequency offset information, time offset information and power offset information and the like of the terminal.

Step three, after receiving the RNG-RSP message, the terminal matches the frame number, frequency offset information, time offset information and power offset information carried in the RNG-RSP message to its own corresponding information, and after successful matching, the terminal sends a RNG_REQ (Ranging Request) message to the base station to request the base station to distribute bandwidth resources for communication.

Step four, after receiving the RNG-REQ message, the base station distributes a special control channel to the terminal, and informs the terminal of the channel distribution information through the RNG-RSP message by unicast, thereby allowing the terminal to access the network successfully.

In this example of the present invention, the terminal is positioned precisely based on the time offset information in the above step two.

The specific embodiments of the present invention will be further described in detail below with reference to the drawings and examples.

Figure 1:
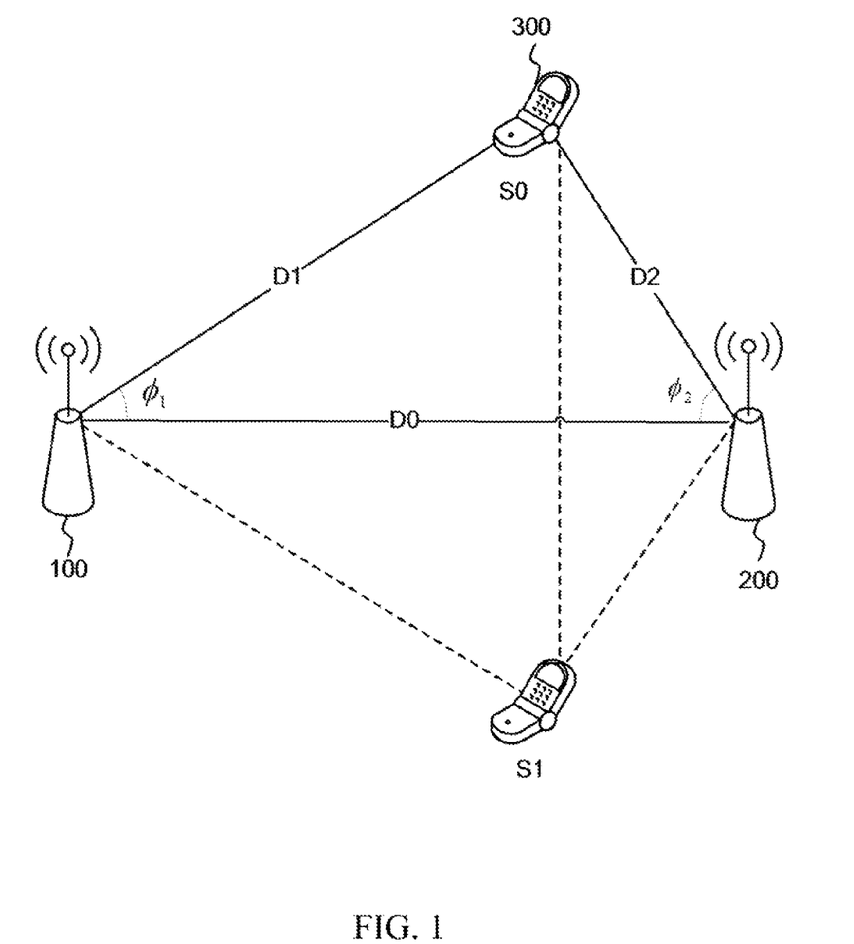
FIG. 1 illustrates a specific application scene of the terminal positioning system according to an example of the present invention.
Figure 2:
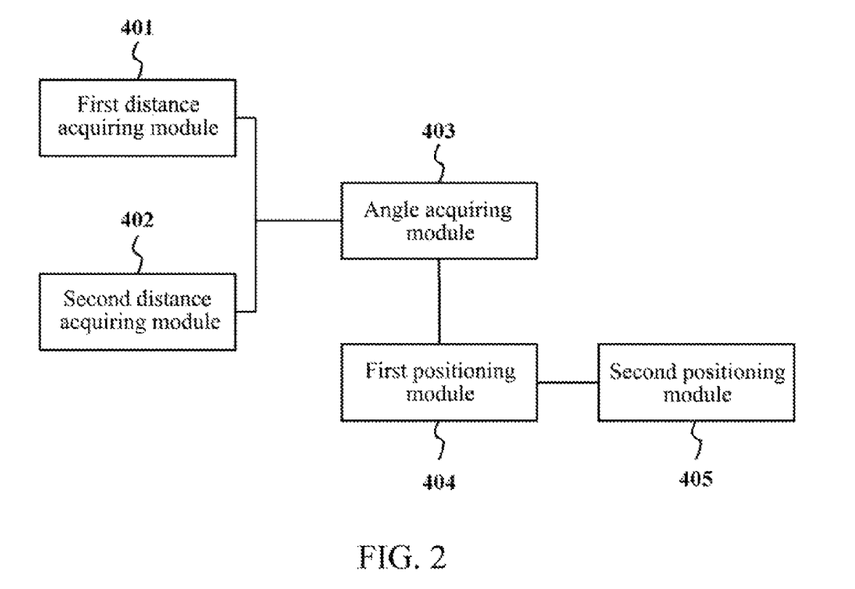
FIG. 2 illustrates a structure of the terminal positioning system according to an example of the present invention.

FIG. 1 illustrates a specific application scene of the terminal positioning system according to an example of the present invention. The terminal positioning system comprises: a first base station 100, a second base station 200 and a terminal 300 to be positioned which is located in an overlapped coverage area of the first base station 100 and the second base station 200.

When accessing a network, the terminal 300 will originate an initial ranging, and sends an initial ranging code to the first base station 100 and the second base station 200 respectively. The first base station 100 and the second base station 200 may be two base stations with the strongest signals among all serving base stations of the terminal 300.

The terminal positioning system further comprises:

a first distance acquiring module 401, which is configured to acquire a first distance between the first base station 100 and the terminal 300 according to first time offset information of the terminal 300, wherein, the first time offset information is time offset information, obtained in a process of the first base station 100 ranging for the terminal 300, of the terminal 300 relative to the first base station 100 is;

the first distance between the first base station 100 and the terminal 300 can be calculated using the following formula:

$$D_1 = [(\tau_1/\text{Bandwidth})*\text{Velocity}]/2$$

wherein, $D_1$ is the first distance, $\tau_1$ is the first time offset information, Bandwidth is a transmission bandwidth of the system, which is generally quantified to be a point number of Fast Fourier transform (FFT), for example, when the bandwidth is 10M, the Bandwidth is 1024, and when the bandwidth is 5M, the Bandwidth is 512, and Velocity is a transmission velocity of the signal, which is commonly $3\times10^8$ m/s;

a second distance acquiring module 402, which is configured to acquire a second distance between the second base station 200 and the terminal 300 according to second time offset information of the terminal 300, wherein, the second time offset information is time offset information, obtained in a process of the second base station 200 ranging for the terminal 300, of the terminal 300 relative to the second base station 200;

the second distance between the second base station 200 and the terminal 300 can be calculated using the following formula:

$$D_2 = [(\tau_2/\text{Bandwidth})*\text{Velocity}]/2$$

wherein, $D_2$ is the second distance, $\tau_2$ is the second time offset information, Bandwidth is a transmission bandwidth of the system, which is generally quantified to be a point number of Fast Fourier transform (FFT), for example, when the bandwidth is 10M, the Bandwidth is 1024, and when the bandwidth is 5M, the Bandwidth is 512, and Velocity is a transmission velocity of the signal;

an angle acquiring module 403, which is configured to acquire a first signal arrival angle of the terminal 300 relative to the first base station 100 and a second signal arrival angle of the terminal 300 relative to the second base station 200 according to the first distance, the second distance and a third distance between the first base station 100 and the second base station 200.

As shown in FIG. 1, the first bases station 100, the first bases station 200 and the terminal 300 can be taken as three vertices of a triangle, and the first distance between the first base station 100 and the terminal 300, the second distance between the second base station 200 and the terminal 300, and the third distance between the first base station 100 and the second base station 200 are taken as the three side lengths $D_1$, $D_2$, $D_0$ of the triangle respectively, wherein, the angle $\phi_1$ between the side length $D_1$ and the side length $D_0$ is the first signal arrival angle, and the angle $\phi_2$ between the side length $D_2$ and the side length $D_0$ is the second signal arrival angle. In a case where the three side lengths of the triangle are already known, the degree of the each angle of the triangle can be calculated according to the cosine theorem.

The first signal arrival angle is calculated using the following formula:

$$\cos\phi_1 = \frac{D_1^2 + D_0^2 - D_2^2}{2 \times D_1 \times D_0}$$

the second signal arrival angle is calculated using the following formula:

$$\cos\phi_2 = \frac{D_2^2 + D_0^2 - D_1^2}{2 \times D_2 \times D_0}$$

wherein, $\phi_1$ is the first signal arrival angle, $\phi_2$ is the second signal arrival angle, $D_1$ is the first distance, $D_2$ is the second distance, and $D_0$ is the third distance.

The terminal positioning system further comprises a first positioning module 404, which is configured to obtain an initial location of the terminal 300 according to the first signal arrival angle and the second signal arrival angle.

Since both the first signal arrival angle and the second signal arrival angle are relative angle values, and their angle directions cannot be determined, as shown in FIG. 1, two initial locations S0 and S1 of the terminal 300 can be obtained according to the first signal arrival angle and the second signal arrival angle, where S0 is the accurate location of the terminal 300, while S1 is positioning interference information of the terminal 300.

The terminal positioning system further comprises a second positioning module 405, which is configured to calibrate the initial location of the terminal 300 and determine the accurate location of the terminal 300. That is, the accurate location of the terminal 300 is determined by excluding the positioning interference information of the terminal 300 as shown in FIG. 1.

The method for the second positioning module 405 to determine the accurate location of the terminal 300 will be described in detail below.

The BF (Beamforming) technique can be adopted in this example of the present invention to determine the accurate location of the terminal. Firstly the principle for implementing the BF technique will be explained briefly below.

Figure 3:
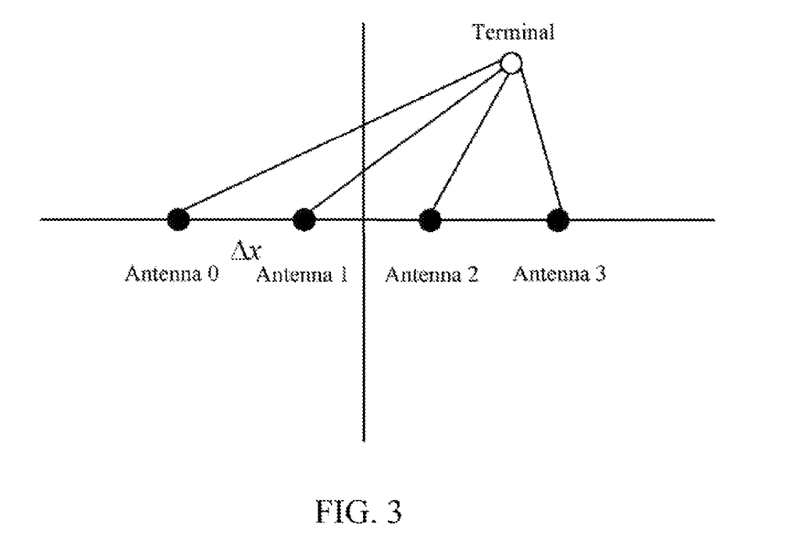
FIG. 3 illustrates the arranging locations of the antenna array according to an example of the present invention.

A base station receives and transmits signals through an antenna array. FIG. 3 illustrates the arranging locations of the antenna array in this example of the present invention, where the antenna array comprises four antennae, which are antenna 0, antenna 1, antenna 2 and antenna 3 respectively. As can be seen from FIG. 3, the distances of the passages from the terminal to the four antennae vary to certain extent, so the times when the four antennae receive the same signal sent by the terminal will also differ, that is, the same signal received by the four antennae has a phase difference.

It is assumed that the passage distance between the terminal and the antenna 0 is L0, the passage distance between the terminal and the antenna 1 is L1, and the signal emitted by the terminal is $\lambda$, then the phase difference $\omega$01 between the signal received by the antenna 1 and the signal received by the antenna 0 is $\omega$01=((L1−L0)/$\lambda$)*2$\pi$. Likewise, the phase difference $\omega$02 between the signal received by the antenna 2 and the signal received by the antenna 0 is $\omega$02=((L2−L0)/$\lambda$)*2$\pi$, and the phase difference $\omega$03 between the signal received by the antenna 3 and the signal received by the antenna 0 is $\omega$03=((L3−L0)/$\lambda$)*2$\pi$, where L2 is the passage distance between the terminal and the antenna 2, and L3 is the passage distance between the terminal and the antenna 3.

According to the mutual inverse of wireless communication channel, if the antenna 0, antenna 1, antenna 2 and antenna 3 emit a signal with an initial phase of $\phi$ simultaneously, then the phase difference between the signal of the antenna 1 and the signal of the antenna 0 received by the terminal is $\omega$01, the phase difference between the signal of the antenna 2 and the signal of the antenna 0 received by the terminal is $\omega$02, and the phase difference between the signal of the antenna 3 and the signal of the antenna 0 received by the terminal is $\omega$03.

According to the superposition principle of beams, if the phases of various signals arriving at the terminal simultaneously are different, then attenuation, or even addition of wave trough and wave crest, may occur after signals are superimposed, thus causing the power of signal to decrease, and the receiving efficiency of the corresponding terminal to deteriorate.

In order that the power of the signal received at the terminal is stronger, the signal may be made to have the same phase when arriving at the terminal as much as possible when the signal is emitted. Specifically, when the four antennae emit signals, the signal emitted by each antenna may be added with a compensation phase in advance so that the signal received by the terminal has the same phase. For example, the phases of the signals emitted by the four antennae can be shaped into $\phi$, $\phi$-$\omega$01, $\phi$-$\omega$02 and $\phi$-03 respectively. The above method of adjusting the emitting phases of different antennae so that the signals arriving at the terminal can be superimposed with the same phase is also called as phase weighting.

It is assumed that the four antennae in the antenna array of the base station are equally spaced linearly, the interval between every adjacent two antennae is $\Delta x$, and the antenna array receives signals emitted by the terminal from spatial direction ($\theta$,$\phi$), wherein, the phase difference between the signal received by the array element m (the $m^{th}$ antenna in the antenna array) and the signal received by the original point reference array element is (the array center is taken as the original point reference array element in this example of the present invention, and the phase at the original point reference array element is 0):

$$\Delta \psi_m = \beta(x_m \cos\phi \sin\theta + y_m \sin\theta \sin\phi + z_m \cos\theta) \quad (1)$$

wherein, $\phi$ is the angle between the horizontal direction of the terminal and the straight line where the array element in the antenna array is, $\theta$ is the angle of elevation of the antenna array relative to the terminal, where in this example of the present invention it is assumed that the terminal and the antenna array are located in the same horizontal plane, that is, it is considered that $\theta$ is 0, $\beta$ is the power amplitude of the antenna array, $x_m$, $y_m$, $z_m$ are the coordinate values of the projections of the terminal on the spatial coordinate system respectively.

It can be known from the formula (1) and $x_m = m\Delta x$ that the signal $u_m(t)$ received by the array element m is:

$$u_m(t) = As(t)e^{-j\beta m\Delta x \cos\phi \sin\theta} \quad (2)$$

wherein, As(t) is the signal measured at the original point reference array element, A is the gain constant of the antenna, where in this example of the present invention it is assumed that all antennae in the antenna array are omni antennae and have the same gain in each direction, s(t) is the plane modulation wave, $x_m$ is the X-axis coordinate value of the projection of the terminal on the spatial coordinate system, and is also the distance between the array element m and the original point reference array element.

According to formula (2), the output signal z(t) of the antenna array (i.e., the superimposed signal of the four antennae) can be obtained as:

$$z(t) = \sum_{m=0}^{M-1} w_m u_m(t) = As(t) \sum_{m=0}^{M-1} w_m e^{-j\beta m\Delta x \cos\phi \sin\theta} = As(t)f(\theta, \phi) \quad (3)$$

wherein, M is the number of antennae in the antenna array, $w_m$ is the phase weighted factor of the array element m, f($\theta$,$\phi$) is the array factor, which, as can be seen from the formula (3), is a function of the spatial direction ($\theta$,$\phi$) of the terminal and determines the ratio of the output signal z(t) of the antenna array to the signal As(t) at the original point reference array element, so the maximum major lobe of the array factor can be oriented to any direction by ($\theta$,$\phi$) by adjusting the phase weighted factor.

Make the phase weighted factor of the $m^{th}$ array element $w_m = e^{j\beta m\Delta x(\cos\phi \sin\theta - \cos\phi_0)}$, then the calculation formula of the array factor of the antenna array is changed to:

$$f(\theta, \phi) = \sum_{m=0}^{M-1} e^{-j\beta m\Delta x(\cos\phi \sin\theta - \cos\phi_0)} = \frac{\sin\left(\frac{\beta M\Delta x}{2}(\cos\phi\sin\theta - \cos\phi_0)\right)}{\sin\left(\frac{\beta \Delta x}{2}(\cos\phi\sin\theta - \cos\phi_0)\right)} e^{-j\frac{\beta\Delta x}{2}(\cos\phi\sin\theta - \cos\phi_0)} \quad (4)$$

In an OFDMA (Orthogonal Frequency Division Multiple Access) system, each carrier of each antenna is multiplied by the same phase weighted factor $w_m$, the phase weighted factors of different antennae are different, and the effect of superimposing several paths of antenna beams may form a directed beam in the air.

As can be seen from the formula (4), the direction of the beam emitted by the antenna array can be oriented to any expected direction just by adjusting the value of $\phi_0$.

Figure 4:
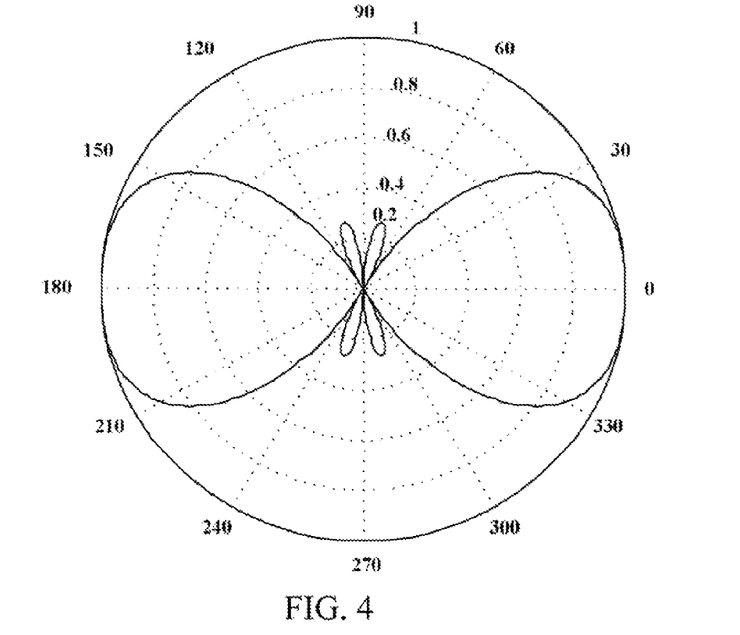
FIG. 4 illustrates the distribution of array elements when $\phi_0 = 0°$ according to an example of the present invention.

FIG. 4 illustrates the distribution of array elements when $\phi_0$=0° according to an example of the present invention, where the total field beam diagram is obtained by multiplying the electric field of a single antenna by the array factor, that is, $$E(\text{total}) = [E(\text{single element at reference point})] \times [\text{array factor}]$$

Figure 5:
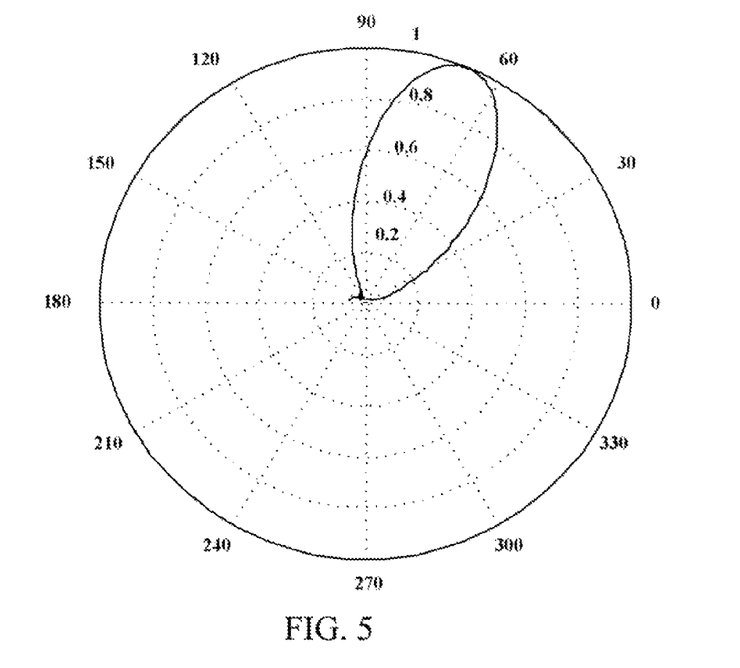
FIG. 5 illustrates the distribution of array elements when $\phi_0 = 70°$ according to an example of the present invention.

After being multiplied by the direction diagram of a single antenna, the major lobe of the direction diagram deviates from the expected angle $\phi_0$ (except 0° and 180°), and the amplitude is also caused to change. As can be seen, the array factor has a huge impact on the formed beam. A complete beam can be obtained with a range of 60°-120° of $\phi_0$, while in other cases, a bandwidth of 3 dB can be obtained when close to the angles 60°-120°, and when the angles are far from this range, even a bandwidth of 3 dB cannot be obtained, thus loosing the meaning of beam formation. A valid beam can be obtained in the range of 40°<$\phi_0$<140°, while in other areas the bandwidth of 3 dB cannot be obtained since the beam is too wide, and there is a big side lobe. FIG. 5 illustrates the distribution of array elements when $\phi_0$=70° according to an example of the present invention, from which it can be seen that the directing effect of the beam will be improved after a side lobe suppressing ratio is added.

The 0.2 to 1 marked in the above FIG. 4 and FIG. 5 are normalized amplitude values (which practically are directly proportional to the emitting power of a remote radio frequency unit).

In this example of the present invention, the beam forming technique can be adopted to control the first base station 100 to emit to the terminal 300 a directed beam oriented to the $\phi_1$ direction, or can also control the second base station 200 to emit to the terminal 300 a directed beam oriented to the $\phi_2$ direction.

The terminal positioning system compares the signal quality parameters, for example signal quality parameters such as CINR (Carrier to Interference+Noise Ratio) of the downlink data and the like, reported by the terminal before and after the directed beam (i.e., beam shaping) is emitted. If the CINR value of the downlink data after the directed beam is emitted is obviously greater, it can be considered that at this moment the terminal is right on the intersecting point of the direction line of $\theta_1$ and the direction line of $\theta^2$, otherwise, it is considered that the terminal is right on the intersecting point of the direction line of $-\theta_1$ and the direction line of $-\theta_2$.

Since the TDD (Time Division Duplex) technique is adopted, the CINR value of the downlink data after the beam shaping will be reported in the uplink sub-frame of the present frame and thus is good in real-time. In order to increase the reliability of the comparison result, a multi-frame averaging manner can be used, that is, average values of the CINR values are calculated for several frames before beam shaping and for several frames after beam shaping, and then the average values are compared.

Figure 6:
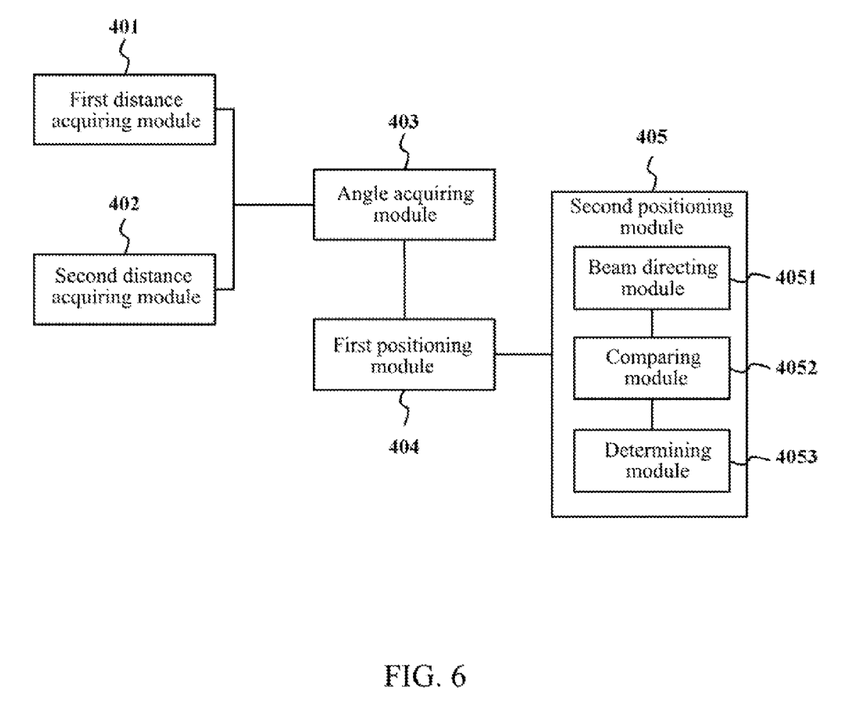
FIG. 6 illustrates another structure of the terminal positioning system according to an example of the present invention.

Based on the above description, the second positioning module 405 has a structure as shown in FIG. 6, and comprises:

a beam directing module 4051, which is configured to control an antenna array of the first base station 100 to emit to the terminal 300 a directed beam oriented to the first signal arrival angle, or control an antenna array of the second base station 200 to emit to the terminal 300 a directed beam oriented to the second signal arrival angle.

The directed beam is:

$$z(t) = As(t) \sum_{m=0}^{M-1} w_m e^{-j\beta m \Delta x \cos\phi \sin\theta}$$

wherein, z(t) is the directed beam, As(t) is a signal measured at an original point reference array element, M is a number of antennae in the antenna array, $w_m$ is a phase weighted factor of a $m^{th}$ array element in the antenna array, $\beta$ is an amplitude of a power of the antenna array, m$\Delta$x is a distance between the $m^{th}$ array element and the original point reference array element, $\phi$ is the first signal arrival angle or the second signal arrival angle, and $\theta$ is an angle of elevation of the antenna array relative to the terminal.

The second positioning module 405 further comprises: a comparing module 4052, which is configured to compare signal quality parameters reported by the terminal before and after the directed beam is emitted, and obtain a comparison result;

a determining module 4053, which is configured to calibrate the initial location of the terminal according to the comparison result to determine the accurate location of the terminal. In the above example, the first distance acquiring module 401, the second distance acquiring module 402, the angle acquiring module 403, the first positioning module 404 and the second positioning module 405 can all located in a special positioning server, which can, when needing to position the terminal 300, acquire from the first base station 100 the first time offset information obtained when the first base station 100 performs initial ranging for the terminal 300, calculate the first distance between the terminal 300 and the first base station 100 according to the first time offset information, and acquire from the second base station 200 the second time offset information obtained when the second base station 200 performs initial ranging for the terminal 300, calculate the second distance between the terminal 300 and the second base station 200 according to the second time offset information, and acquire the angle relationship between the terminal 300 and the first and second base stations 100 and 200 according to the first distance, the second distance, and the third distance between the first base station 100 and the second base station 200, thereby initially positioning the terminal 300, and control the first base station 100 or the second base station 200 to emit a directed beam to the terminal 300 according to beam forming technique to accurately position the terminal 300.

In addition, the above positioning process can also be implemented by the first base station 100 or the second base station 200. By taking the case where the first base station 100 implements the positioning process as an example, that is, the first distance acquiring module 401, the second distance acquiring module 402, the angle acquiring module 403 and the first positioning module 404 and the second positioning module 405 are located in the first base station 100, which, when needing to position a terminal 300, acquires the first time offset information obtained when the first base station 100 performs initial ranging for the terminal 300, calculates the first distance between the terminal 300 and the first base station 100 according to the first time offset information; and acquires from the second base station 200 the second time offset information obtained when the second base station 200 performs initial ranging for the terminal 300, calculates the second distance between the terminal 300 and the second base station 200 according to the second time offset information, or the second distance between the terminal 300 and the first base station 200 can be calculated by the second base station 200 and then sent to the firs base station 100; the first base station 100 acquires the angle relationship between the terminal 300 and the first and second base stations 100 and 200 according to the first distance, the second distance, and the third distance between the first base station 100 and the second base station 200, thereby initially positioning the terminal 300, and emits a directed beam to the terminal 300 according to beam forming technique to accurately position the terminal 300.

Or, the above positioning process can also be implemented by a special positioning server in conjunction with a base station (the first base station 100 or the second base station 200), that is, part of the first distance acquiring module 401, the second distance acquiring module 402, the angle acquiring module 403 and the first positioning module 404 and the second positioning module 405 are located in the positioning server, while the remaining part is in the base station.

Through the terminal positioning system provided in the above example, the time offset information of terminal obtained during the initial ranging process of the base station for the terminal is acquired, and the distance between the terminal and the base station is acquired according to the time offset information, the angle relationship between the base station for the terminal is acquired according to the distance between the terminal and the base station, and the terminal is initially positioned, and then the terminal is accurately positioned according to the multi-antenna calibrating mechanism in the beam forming technology. Since the positioning parameters (time offset information) adopted in the present invention are existing resources in the initial ranging process of the base station for the terminal, no additional channel is required to transmit related positioning data, thus saving network resources.

Figure 7:
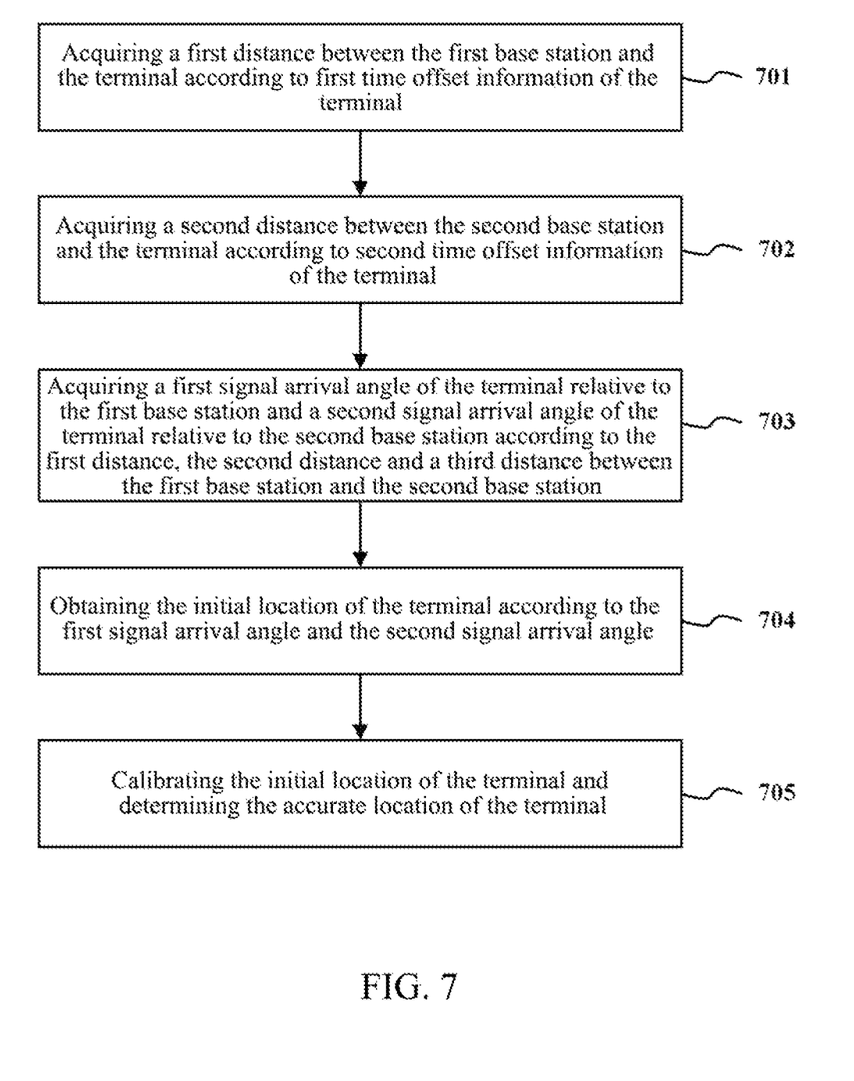
FIG. 7 illustrates a flow of the terminal positioning method according to an example of the present invention.

FIG. 7 illustrates a flow of the terminal positioning method according to an example of the present invention. The terminal positioning method is applied to the terminal positioning system described in the above examples, and the terminal positioning system comprises: a first base station, a second base station and a terminal to be positioned which is located in an overlapped coverage area of the first base station and the second base station; the terminal positioning method comprises the following steps.

Step 701, the terminal positioning system acquires a first distance between the first base station and the terminal according to first time offset information of the terminal, wherein, the first time offset information is time offset information, obtained in a process of the first base station ranging for the terminal, of the terminal relative to the first base station. The first distance between the first base station and the terminal can be calculated using the following formula:

$$D_1 = [(\tau_1/\text{Bandwidth})*\text{Velocity}]/2$$

wherein, $D_1$ is the first distance, $\tau_1$ is the first time offset information, Bandwidth is a transmission bandwidth of the system, which is usually quantified to be a point number of Fast Fourier transform (FFT), for example, when the bandwidth is 10M, the Bandwidth is 1024, and when the bandwidth is 5M, the Bandwidth is 512, for example, it can be 11.2 Mhz, and Velocity is the transmission velocity of the signal, which is commonly $3 \times 10^8$ m/s.

Step 702, the terminal positioning system acquiring a second distance between the second base station and the terminal according to second time offset information of the terminal, wherein, the second time offset information is time offset information, obtained in a process of the second base station ranging for the terminal, of the terminal relative to the second base station.

The second distance between the second base station and the terminal can be calculated using the following formula:

$$D_2 = [(\tau_2/\text{Bandwidth})*\text{Velocity}]/2$$

wherein, $D_2$ is the second distance, $\tau_2$ is the second time offset information, Bandwidth is a transmission bandwidth of the system, which is usually quantified to be a point number of Fast Fourier transform (FFT), for example, when the bandwidth is 10M, the Bandwidth is 1024, and when the bandwidth is 5M, the Bandwidth is 512, and Velocity is the transmission velocity of the signal.

Step 703, the terminal positioning system acquiring a first signal arrival angle of the terminal relative to the first base station and a second signal arrival angle of the terminal relative to the second base station according to the first distance, the second distance and a third distance between the first base station and the second base station.

The first signal arrival angle is calculated using the following formula:

$$\cos\phi_1 = \frac{D_1^2 + D_0^2 - D_2^2}{2 \times D_1 \times D_0}$$

the second signal arrival angle is calculated using the following formula:

$$\cos\phi_2 = \frac{D_2^2 + D_0^2 - D_1^2}{2 \times D_1 \times D_0}$$

wherein, $\phi_1$ is the first signal arrival angle, $\phi_2$ is the second signal arrival angle, $D_1$ is the first distance, $D_2$ is the second distance, and $D_0$ is the third distance.

Step 704, the terminal positioning system obtaining the initial location of the terminal according to the first signal arrival angle and the second signal arrival angle.

Since both the first signal arrival angle and the second signal arrival angle are relative angle values, and their angle directions cannot be determined, two initial locations of the terminal can be obtained according to the first signal arrival angle and the second signal arrival angle, where one of them is the accurate location of the terminal, while the other is positioning interference information of the terminal.

Step 705, the terminal positioning system calibrating the initial location of the terminal and determining the accurate location of the terminal, i.e., determining the accurate location of the terminal by excluding the positioning interference information of the terminal.

In this example of the present invention, the accurate location of the terminal can be determined by adopting the beam forming technique, and at this moment, the step 705 further comprises the following steps:

step one, the terminal positioning system controlling an antenna array of the first base station to emit to the terminal a directed beam oriented to the first signal arrival angle, or controlling an antenna array of the second base station to emit to the terminal a directed beam oriented to the second signal arrival angle;

wherein, the directed beam is:

$$z(t) = As(t) \sum_{m=0}^{M-1} w_m e^{-j\beta m \Delta x \cos\phi \sin\theta}$$

wherein, z(t) is the directed beam, As(t) is a signal measured at an original point reference array element, M is a number of antennae in the antenna array, $w_m$ is a phase weighted factor of a $m^{th}$ array element in the antenna array, $\beta$ is an amplitude of a power of the antenna array, $m\Delta x$ is a distance between the $m^{th}$ array element and the original point reference array element, $\phi$ is the first signal arrival angle or the second signal arrival angle, and $\theta$ is an angle of elevation of the antenna array relative to the terminal;

step two, the terminal positioning system comparing signal quality parameters reported by the terminal before and after the directed beam is emitted, and obtaining a comparison result;

step three, the terminal positioning system calibrating the initial location of the terminal according to the comparison result to determine the accurate location of the terminal.

Through the terminal positioning method provided in the above example, the time offset information of terminal obtained during the initial ranging process of the base station for the terminal is acquired, and the distance between the terminal and the base station is acquired according to the time offset information, the angle relationship between the base station and the terminal is acquired according to the distance between the terminal and the base station, and then the terminal is initially positioned, and then the terminal is accurately positioned according to the multi-antenna calibrating mechanism in the beam forming technology. Since the positioning parameters (time offset information) adopted in the present invention are existing resources in the initial ranging process of the base station for the terminal, no additional channel is required to transmit related positioning data, thus saving network resources.

Those skilled in the art shall understand that all of or part of the steps in the above methods can be completed by instructing relevant hardware by programs, and the programs can be stored in a computer readable storage medium, such as a read only memory, a magnetic disk, or an optical disk, etc. Optionally, all of or part of the steps of the above examples can also be implemented using one or more integrated circuits. Accordingly, the modules/units in the above examples can be implemented in the form of hardware and can also be implemented in the form of software function modules. The present invention is not limited to any particular form of combination of hardware and software.

The above examples are only preferred embodiments of the present invention, and it should be pointed out that for a person having ordinary skill in the art, several improvements and modifications can be made to the present invention without departing from the principle of the present invention. These improvements and modifications shall be construed as within the protection scope of the present invention.

Industrial Applicability

In the terminal positioning system and the terminal positioning method provided in the present invention, since the adopted positioning parameters (time offset information) are the existing resources in the process of the base station initially ranging for the terminal, no additional channel is required to transmit related positioning data, thus saving network resources.

What is claimed is:

1. A terminal positioning system, comprising: a first base station, a second base station and a terminal to be positioned which is located in an overlapped coverage area of the first base station and the second base station, and the system further comprises:
    a first distance acquiring module, which is configured to acquire a first distance between the first base station and the terminal according to first time offset information of the terminal, wherein, the first time offset information is time offset information, obtained in a process of the first base station ranging for the terminal, of the terminal relative to the first base station;
    a second distance acquiring module, which is configured to acquire a second distance between the second base station and the terminal according to second time offset information of the terminal, wherein, the second time offset information is time offset information, obtained in a process of the second base station ranging for the terminal, of the terminal relative to the second base station;
    an angle acquiring module, which is configured to acquire a first signal arrival angle of the terminal relative to the first base station and a second signal arrival angle of the terminal relative to the second base station according to the first distance, the second distance and a third distance between the first base station and the second base station;
    a first positioning module, which is configured to obtain an initial location of the terminal according to the first signal arrival angle and the second signal arrival angle; and
    a second positioning module, which is configured to calibrate the initial location of the terminal to determine an accurate location of the terminal.

2. The terminal positioning system according to claim 1, wherein, the second positioning module comprises:
    a beam directing module, which is configured to control an antenna array of the first base station to emit to the terminal a directed beam oriented to the first signal arrival angle, or control an antenna array of the second base station to emit to the terminal a directed beam oriented to the second signal arrival angle;
    a comparing module, which is configured to compare signal quality parameters reported by the terminal before and after the directed beam is emitted, and obtain a comparison result; and
    a determining module, which is configured to calibrate the initial location of the terminal according to the comparison result to determine the accurate location of the terminal.

3. The terminal positioning system according to claim 2, wherein, the directed beam is:

$$z(t) = As(t) \sum_{m=0}^{M-1} w_m e^{-j\beta m \Delta x \cos\phi \sin\theta}$$

wherein, $z(t)$ is the directed beam, $As(t)$ is a signal measured at an original point reference array element, M is a number of antennae in the antenna array, $w_m$ is a phase weighted factor of a $m^{th}$ array element in the antenna array, $\beta$ is an amplitude of a power of the antenna array, $m\Delta x$ is a distance between the $m^{th}$ array element and the original point reference array element, $\phi$ is the first signal arrival angle or the second signal arrival angle, and $\theta$ is an angle of elevation of the antenna array relative to the terminal.

4. The terminal positioning system according to claim 1, wherein,
    the first distance is calculated using the following formula:

$$D_1 = [(\tau_1/Bandwidth)*Velocity]/2$$

the second distance is calculated using the following formula:

$$D_2 = [(\tau_2/Bandwidth)*Velocity]/2$$

wherein, $D_1$ is the first distance, $D_2$ is the second distance, $\tau_1$ is the first time offset information, $\tau_2$ is the second time offset information, Bandwidth is a transmission bandwidth of the system, which is quantified to be a point number of Fast Fourier transform (FFT), and Velocity is a transmission velocity of the signal.

5. The terminal positioning system according to claim 1, wherein,
the first signal arrival angle is calculated using the following formula:

$$\cos\phi_1 = \frac{D_1^2 + D_0^2 - D_2^2}{2 \times D_1 \times D_0}$$

the second signal arrival angle is calculated using the following formula:

$$\cos\phi_2 = \frac{D_2^2 + D_0^2 - D_1^2}{2 \times D_2 \times D_0}$$

wherein, $\phi_1$ is the first signal arrival angle, $\phi_2$ is the second signal arrival angle, $D_1$ is the first distance, $D_2$ is the second distance, and $D_0$ is the third distance.

6. A terminal positioning method applied in a terminal positioning system, and the terminal positioning system comprises: a first base station, a second base station and a terminal to be positioned which is located in an overlapped coverage area of the first base station and the second base station; the terminal positioning method comprises the following steps:
the terminal positioning system acquiring a first distance between the first base station and the terminal according to first time offset information of the terminal, wherein, the first time offset information is time offset information, obtained in a process of the first base station ranging for the terminal, of the terminal relative to the first base station;
the terminal positioning system acquiring a second distance between the second base station and the terminal according to second time offset information of the terminal, wherein, the second time offset information is time offset information, obtained in a process of the second base station ranging for the terminal, of the terminal relative to the second base station;
the terminal positioning system acquiring a first signal arrival angle of the terminal relative to the first base station and a second signal arrival angle of the terminal relative to the second base station according to the first distance, the second distance and a third distance between the first base station and the second base station;
the terminal positioning system obtaining an initial location of the terminal according to the first signal arrival angle and the second signal arrival angle; and
the terminal positioning system calibrating the initial location of the terminal to determine an accurate location of the terminal.

7. The terminal positioning method according to claim 6, wherein, the step of the terminal positioning system calibrating the initial location of the terminal to determine an accurate location of the terminal comprises:
the terminal positioning system controlling an antenna array of the first base station to emit to the terminal a directed beam oriented to the first signal arrival angle, or controlling an antenna array of the second base station to emit to the terminal a directed beam oriented to the second signal arrival angle;
the terminal positioning system comparing signal quality parameters reported by the terminal before and after the directed beam is emitted, and obtaining a comparison result; and
the terminal positioning system calibrating the initial location of the terminal according to the comparison result to determine the accurate location of the terminal.

8. The terminal positioning method according to claim 7, wherein, the directed beam is:

$$z(t) = As(t) \sum_{m=0}^{M-1} w_m e^{-j\beta m \Delta x \cos\phi \sin\theta}$$

wherein, $z(t)$ is the directed beam, $As(t)$ is a signal measured at an original point reference array element, M is a number of antennae in the antenna array, $w_m$ is a phase weighted factor of a $m^{th}$ array element in the antenna array, $\beta$ is an amplitude of a power of the antenna array, $m\Delta x$ is a distance between the $m^{th}$ array element and the original point reference array element, $\phi$ is the first signal arrival angle or the second signal arrival angle, and $\theta$ is an angle of elevation of the antenna array relative to the terminal.

9. The terminal positioning method according to claim 6, wherein,
the first distance is calculated using the following formula:

$D_1 = [(\tau_1/\text{Bandwidth})*\text{Velocity}]/2$ the second distance is calculated using the following formula:

$D_2 = [(\tau_2/\text{Bandwidth})*\text{Velocity}]/2$ wherein, $D_1$ is the first distance, $D_2$ is the second distance, $\tau_1$ is the first time offset information, $\tau_2$ is the second time offset information, Bandwidth is a transmission bandwidth of the system, which is quantified to be a point number of Fast Fourier transform (FFT), and Velocity is a transmission velocity of the signal.

10. The terminal positioning method according to claim 6, wherein,
the first signal arrival angle is calculated using the following formula:

$$\cos\phi_1 = \frac{D_1^2 + D_0^2 - D_2^2}{2 \times D_1 \times D_0}$$

the second signal arrival angle is calculated using the following formula:

$$\cos\phi_2 = \frac{D_2^2 + D_0^2 - D_1^2}{2 \times D_2 \times D_0}$$

wherein, $\phi_1$ is the first signal arrival angle, $\phi_2$ is the second signal arrival angle, $D_1$ is the first distance, $D_2$ is the second distance, and $D_0$ is the third distance.

11. A terminal positioning apparatus, applied to position a terminal located in an overlapped coverage area of a first base station and a second base station, wherein, the terminal positioning apparatus comprises:
a first distance acquiring module, which is configured to acquire a first distance between the first base station and the terminal according to first time offset information of the terminal, wherein, the first time offset information is time offset information, obtained in a process of the first base station ranging for the terminal, of the terminal relative to the first base station;

a second distance acquiring module, which is configured to acquire a second distance between the second base station and the terminal according to second time offset information of the terminal, wherein, the second time offset information is time offset information, obtained in a process of the second base station ranging for the terminal, of the terminal relative to the second base station;

an angle acquiring module, which is configured to acquire a first signal arrival angle of the terminal relative to the first base station and a second signal arrival angle of the terminal relative to the second base station according to the first distance, the second distance and a third distance between the first base station and the second base station;

a first positioning module, which is configured to obtain an initial location of the terminal according to the first signal arrival angle and the second signal arrival angle; and a second positioning module, which is configured to calibrate the initial location of the terminal to determine an accurate location of the terminal.

12. The terminal positioning apparatus according to claim 11, wherein, the second positioning module comprises:

a beam directing module, which is configured to control an antenna array of the first base station to emit to the terminal a directed beam oriented to the first signal arrival angle, or control an antenna array of the second base station to emit to the terminal a directed beam oriented to the second signal arrival angle;

a comparing module, which is configured to compare signal quality parameters reported by the terminal before and after the directed beam is emitted, and obtain a comparison result; and a determining module, which is configured to calibrate the initial location of the terminal according to the comparison result to determine the accurate location of the terminal.

13. The terminal positioning apparatus according to claim 12, wherein, the directed beam is:

$$z(t) = As(t) \sum_{m=0}^{M-1} w_m e^{-j\beta m \Delta x \cos\phi \sin\theta}$$

wherein, $z(t)$ is the directed beam, $As(t)$ is a signal measured at an original point reference array element, M is a number of antennae in the antenna array, $w_m$ is a phase weighted factor of a $m^{th}$ array element in the antenna array, $\beta$ is an amplitude of a power of the antenna array, $m\Delta x$ is a distance between the $m^{th}$ array element and the original point reference array element, $\phi$ is the first signal arrival angle or the second signal arrival angle, and $\theta$ is an angle of elevation of the antenna array relative to the terminal.

14. The terminal positioning apparatus according to claim 11, wherein, the first distance is calculated using the following formula:

$$D_1 = [(\tau_1/\text{Bandwidth})*\text{Velocity}]/2$$

the second distance is calculated using the following formula:

$$D_2 = [(\tau_2/\text{Bandwidth})*\text{Velocity}]/2$$

wherein, $D_1$ is the first distance, $D_2$ is the second distance, $\tau_1$ is the first time offset information, $\tau_2$ is the second time offset information, Bandwidth is a transmission bandwidth of the system, which is quantified to be a point number of Fast Fourier transform (FFT), and Velocity is a transmission velocity of the signal.

15. The terminal positioning apparatus according to claim 1, wherein, the first signal arrival angle is calculated using the following formula:

$$\cos\phi_1 = \frac{D_1^2 + D_0^2 - D_2^2}{2 \times D_1 \times D_0}$$

the second signal arrival angle is calculated using the following formula:

$$\cos\phi_2 = \frac{D_2^2 + D_0^2 - D_1^2}{2 \times D_2 \times D_0}$$

wherein, $\phi_1$ is the first signal arrival angle, $\phi_2$ is the second signal arrival angle, $D_1$ is the first distance, $D_2$ is the second distance, and $D_0$ is the third distance.

* * * * *